No. 897,012. PATENTED AUG. 25, 1908.
H. R. RADFORD.
MACHINE FOR MAKING WRAPPERS FOR COINS.
APPLICATION FILED FEB. 14, 1907.
6 SHEETS—SHEET 1.
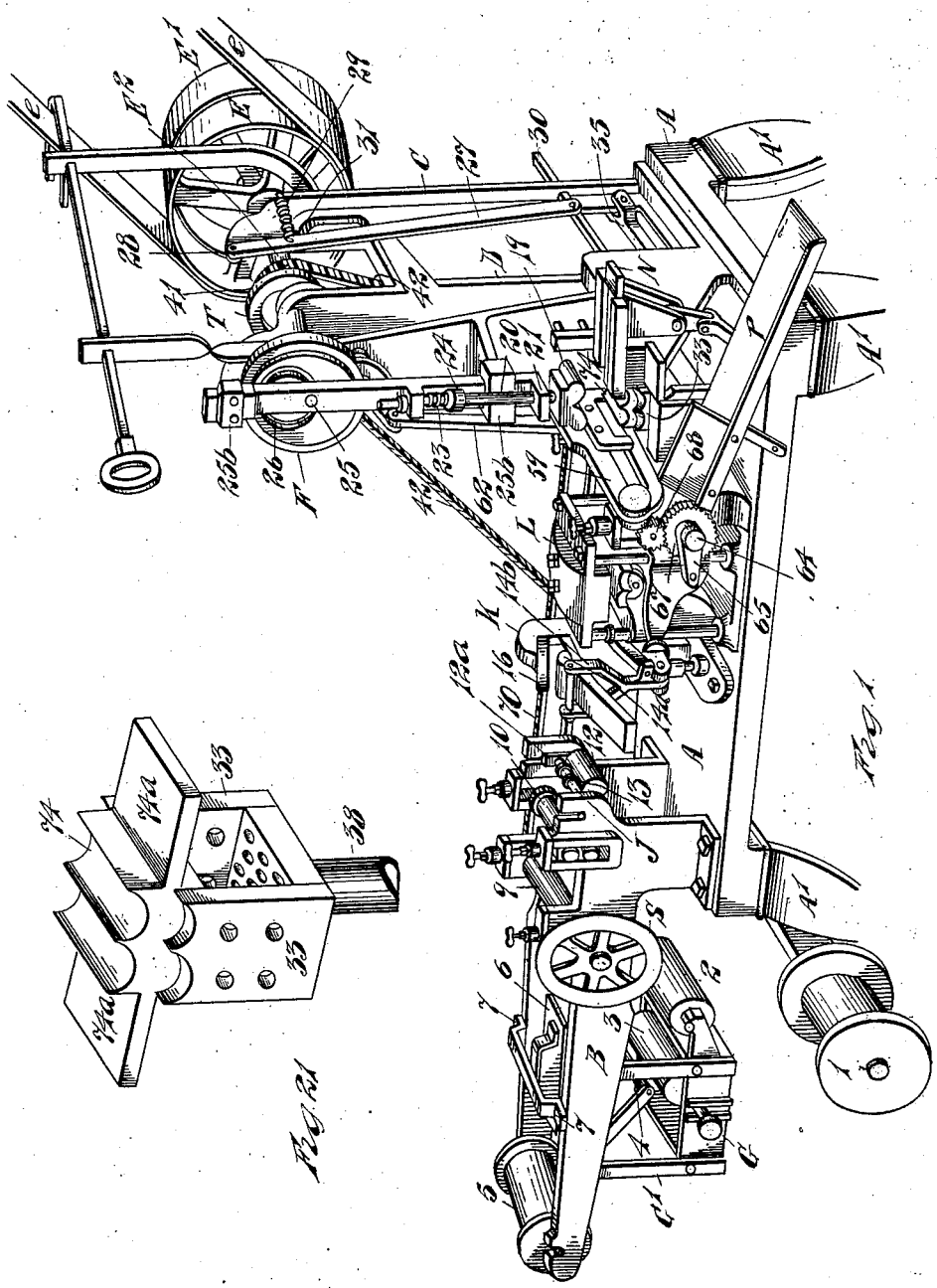
WITNESSES
C. E. Day
Alice Townsend
INVENTOR
Harry R. Radford
By Parker & Burton Attorneys.

No. 897,012. PATENTED AUG. 25, 1908.
H. R. RADFORD.
MACHINE FOR MAKING WRAPPERS FOR COINS.
APPLICATION FILED FEB. 14, 1907.
6 SHEETS—SHEET 2.
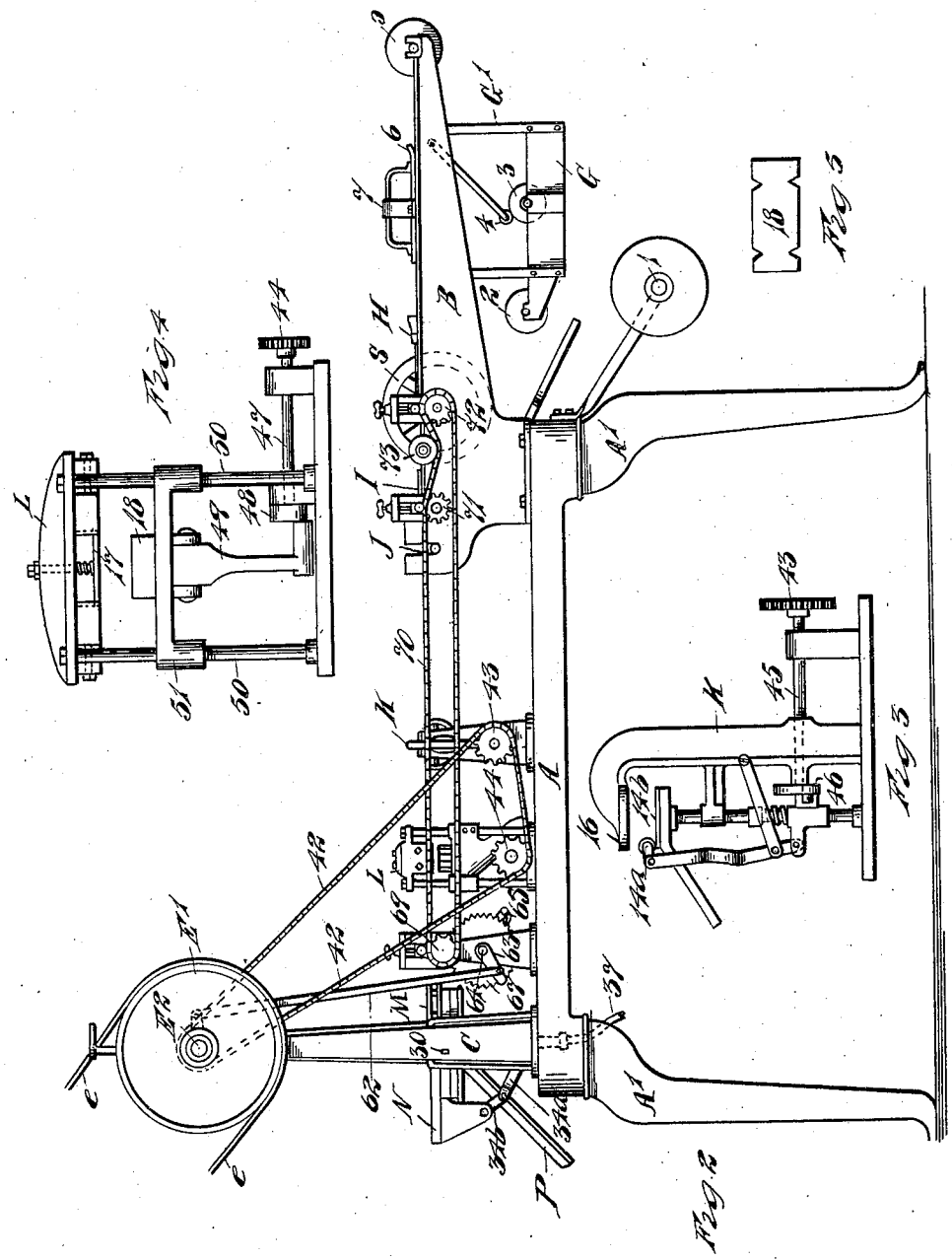
WITNESSES
C. E. Day
Alice Townsend
INVENTOR
Harry R. Radford
By Parker & Burton Attorneys.

No. 897,012.
PATENTED AUG. 25, 1908.
H. R. RADFORD.
MACHINE FOR MAKING WRAPPERS FOR COINS.
APPLICATION FILED FEB. 14, 1907.
6 SHEETS—SHEET 3.
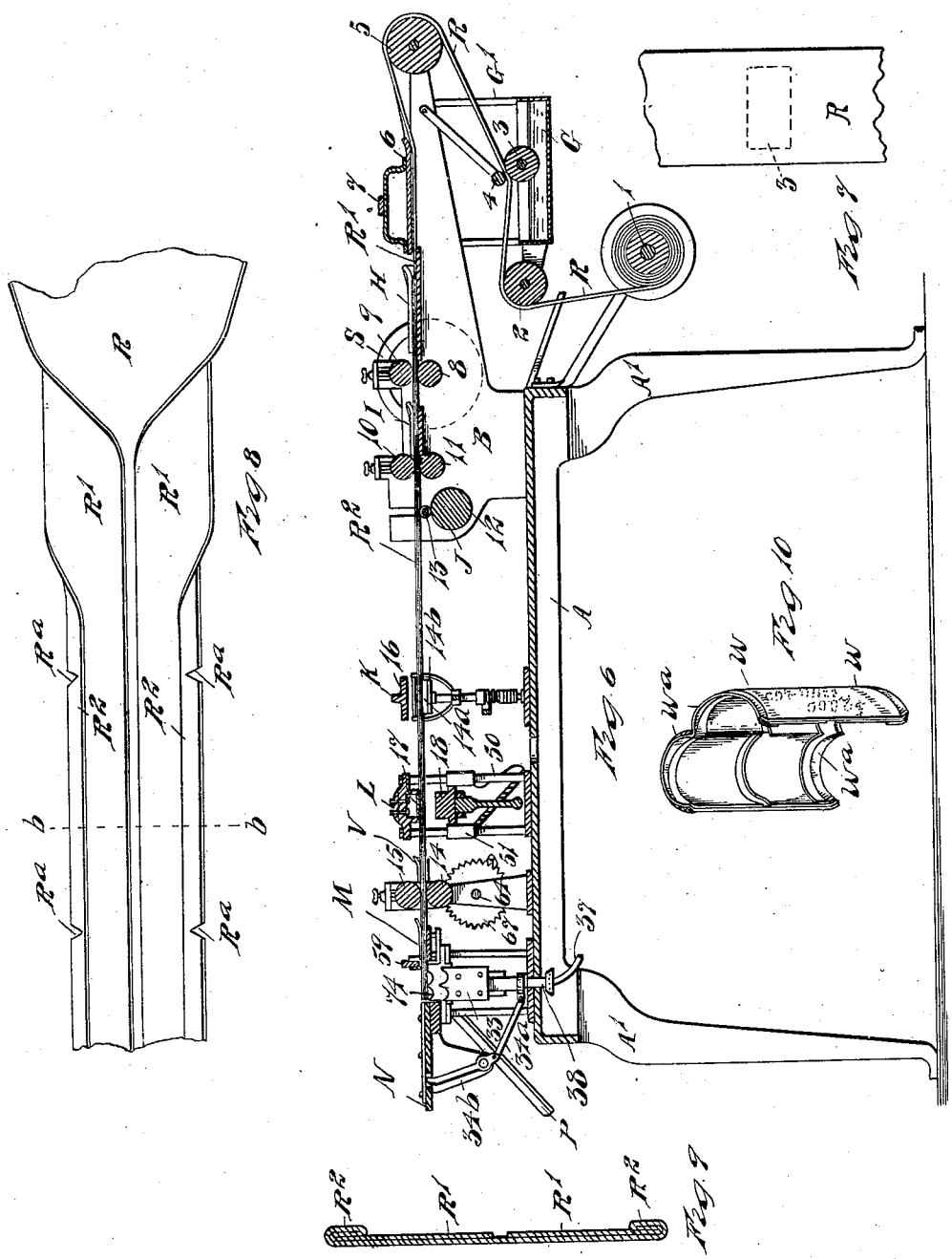
WITNESSES
INVENTOR
Harry R. Radford
By
Parker & Burton Attorneys.

No. 897,012. PATENTED AUG. 25, 1908.
H. R. RADFORD.
MACHINE FOR MAKING WRAPPERS FOR COINS.
APPLICATION FILED FEB. 14, 1907.
6 SHEETS—SHEET 4.
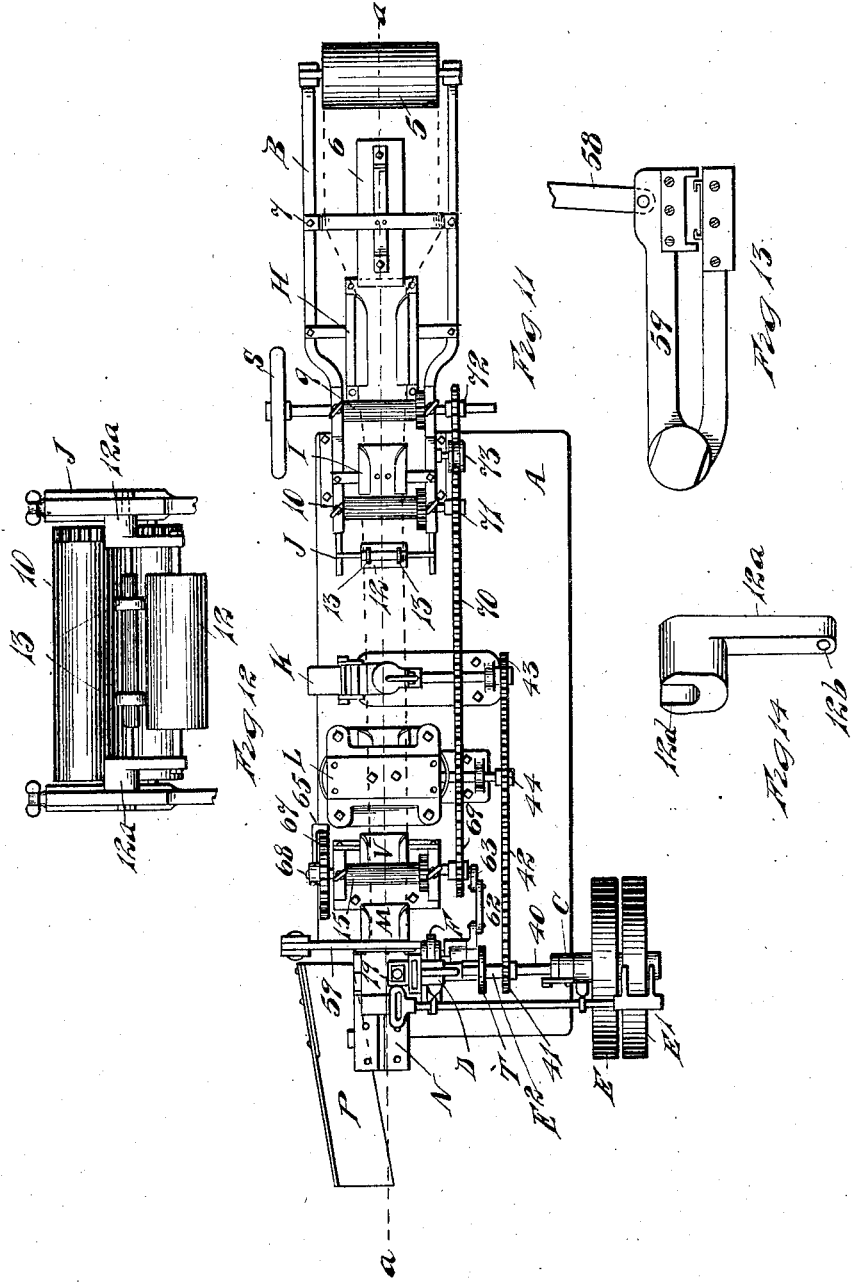
WITNESSES
INVENTOR
Harry R. Radford.
By
Parker & Burton Attorneys.

No. 897,012. PATENTED AUG. 25, 1908.
H. R. RADFORD.
MACHINE FOR MAKING WRAPPERS FOR COINS.
APPLICATION FILED FEB. 14, 1907.
6 SHEETS—SHEET 5.
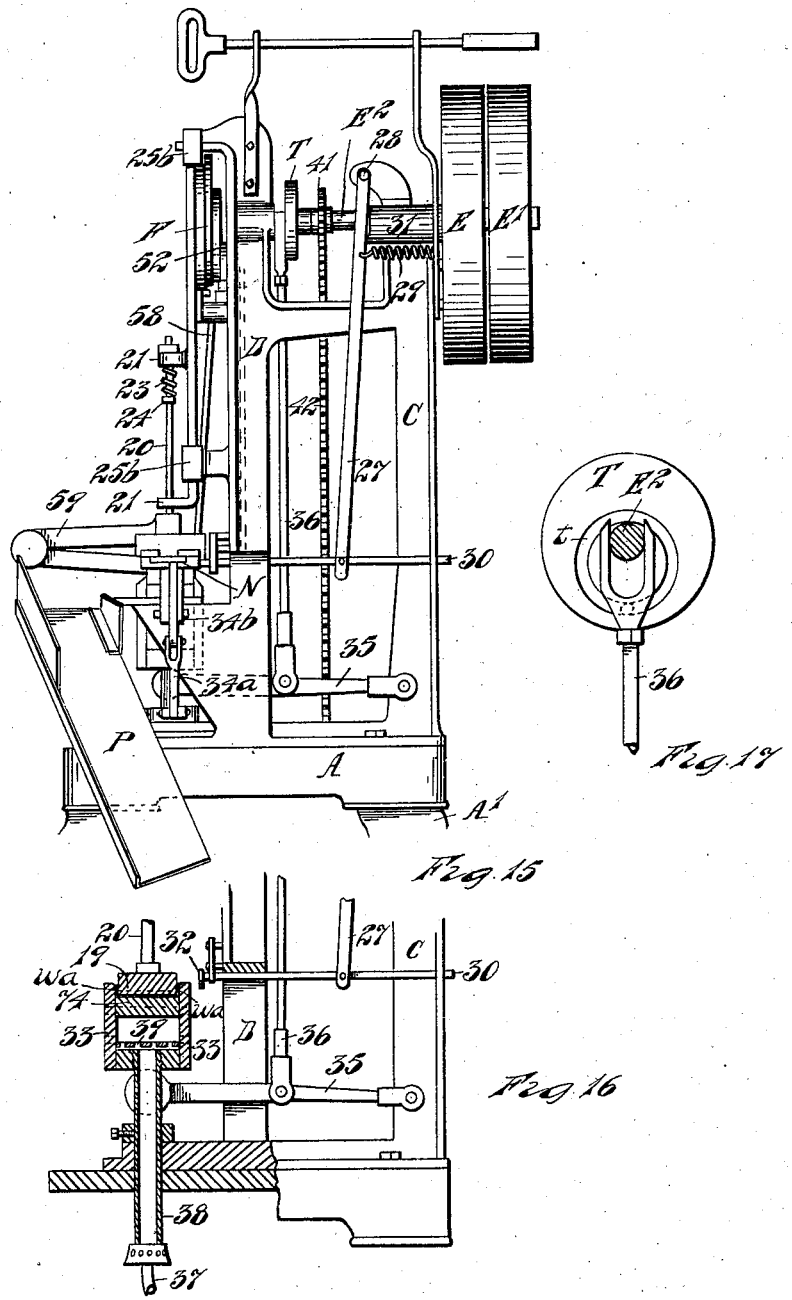
WITNESSES
INVENTOR
Harry R. Radford
By Parker & Burton Attorneys.

No. 897,012.
PATENTED AUG. 25, 1908.
H. R. RADFORD.
MACHINE FOR MAKING WRAPPERS FOR COINS.
APPLICATION FILED FEB. 14, 1907.
6 SHEETS—SHEET 6.
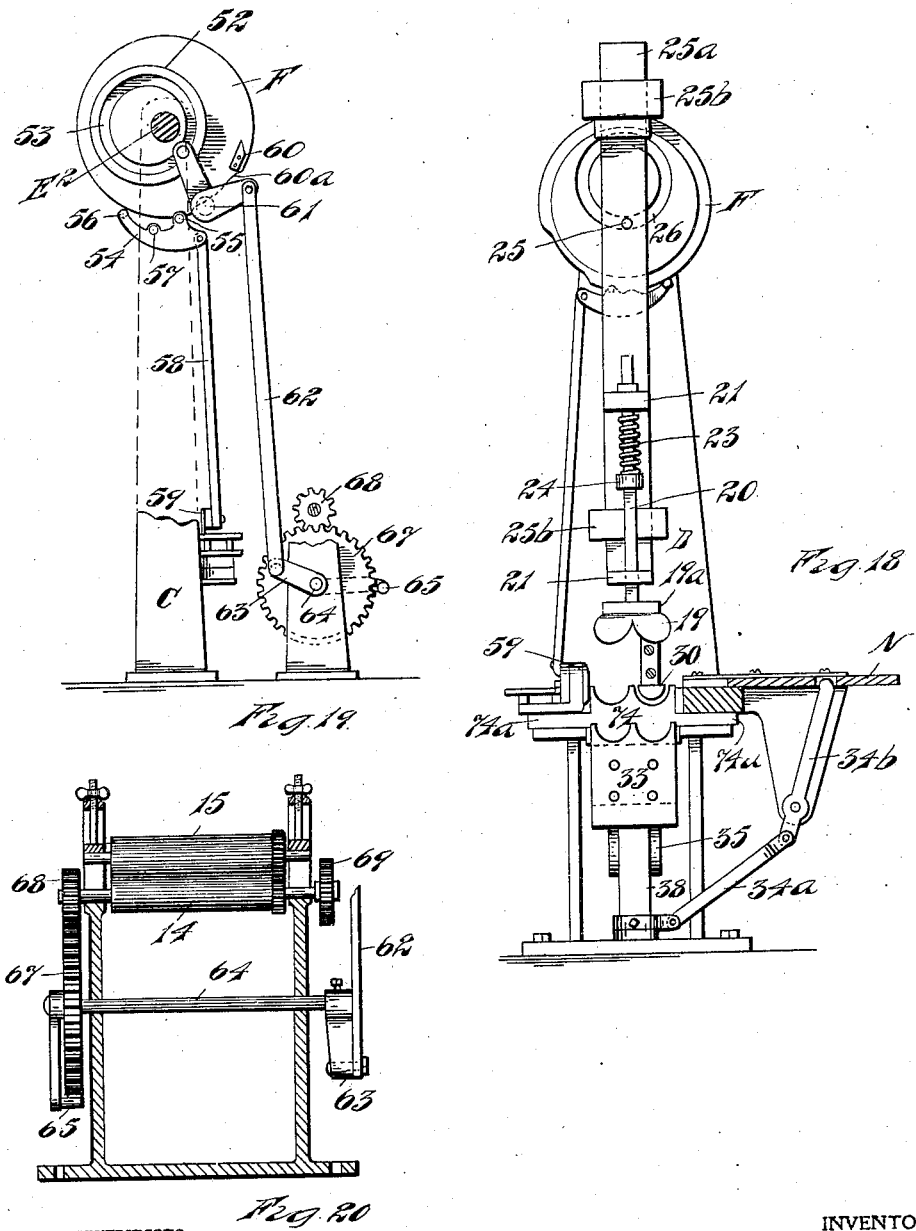
WITNESSES
C. E. Day
Alice Townsend
INVENTOR
Harry R. Radford.
By Parker & Burton Attorneys.

UNITED STATES PATENT OFFICE.

HARRY R. RADFORD, OF DETROIT, MICHIGAN, ASSIGNOR TO THE DETROIT COIN WRAPPER COMPANY, OF WAYNE COUNTY, MICHIGAN, A CORPORATION OF MICHIGAN.

MACHINE FOR MAKING WRAPPERS FOR COINS.

No. 897,012.      Specification of Letters Patent.      Patented Aug. 25, 1908.

Application filed February 14, 1907. Serial No. 357,273.

*To all whom it may concern:*

Be it known that I, HARRY R. RADFORD, a citizen of the United States, residing at Detroit, county of Wayne, State of Michigan, have invented a certain new and useful Improvement in Machines for Making Wrappers for Coin, and declare the following to be a full, clear, and exact description of the same, such as will enable others skilled in the art to which it pertains to make and use the same, reference being had to the accompanying drawings, which form a part of this specification.

This invention relates to a machine for making wrappers for coin, and consists in the improvements hereinafter described, and pointed out in the claims.

In the drawings:—Figure 1, is a perspective view of the entire machine, the paper of which the wrappers are made being removed. Fig. 2, is a side view of the same, the machine being turned around so as to present to view the side away from the observer in Fig. 1. Fig. 3, is a detail of the printing mechanism. Fig. 4, is a detail elevation of the cutting mechanism. Fig. 5, is a plan view showing one of the cutting dies of the mechanism of Fig. 4. Fig. 6, is a sectional elevation, the section being taken on the line $a$—$a$ of Fig. 11. Fig. 7, is a detail view illustrating the relative sizes of the strips of paper and of the gluing roll. Fig. 8, is a plan view of a portion of the paper as it passes through the machine, showing the two successive folds of the same, and the notches cut in the folded paper by the mechanism of Fig. 4. Fig. 9, is a section on the line $b$—$b$ of Fig. 8. Fig. 10, is a perspective view of the wrapper as finished. Fig. 11, is a plan view of the entire mechanism. Fig. 12, is a detail elevation showing the mechanism for putting stripes upon the paper. Fig. 13, is a detail elevation of the cutting knife. Fig. 14, is a detail perspective view of one of the attaching pieces for the roll 12. Fig. 15, is an elevation of the machine looking from the left of Fig. 11. Fig. 16, is a detail view, partly in section, of the heating apparatus and forming dies and adjacent parts. Fig. 17, is a detail elevation of one of the actuating cam-plates and the rod actuated thereby. Fig. 18, is a detail elevation of the part of the machine adjacent to the forming dies. Fig. 19, is an elevation of a part of the actuating mechanism of the machine. Fig. 20, is a detail view, partly in section, illustrating the actuating and motion transmitting mechanism. Fig. 21, is a detail perspective of one of the forming dies and the heating mechanism therefor.

A, is a bed plate of the machine supported upon legs $A^1$, $A^1$, $A^1$.

B, is a frame attached to the bed plate A and extending horizontally therefrom in which frame are supported various shafts and parts of the machine.

C, is one of the standards rising vertically from the side of the bed plate A at the opposite end to that at which the frame B is located.

D, is a second standard similar to C opposite thereto and coöperating with the standard C to support various parts of the actuating mechanism.

$E^2$, is a shaft mounted in bearings in the upper ends of the standards C, D.

E, is a fast pulley upon the shaft $E^2$, and $E^1$, is a loose pulley thereon.

$e$, is a belt passing around the pulleys E or $E^1$, and adapted to be shifted, by any ordinary belt shifter, from one to the other to stop the machine or set it in motion.

F, is a cam plate upon one end of the shaft $E^2$.

G, is a vessel for holding liquid glue, which vessel is supported on hangers $G^1$ depending from the frame B.

H, is a folder by which the first fold in the paper, passing through the machine, is made.

I, is a second folder by which the second fold is made.

J, is the mechanism for putting stripes upon the paper.

K, is the mechanism for printing the label upon the paper.

L, is the mechanism for cutting notches in the side of the folded paper.

V, is a guide for the paper as it enters between feed-rolls 14 and 15.

M, is a guide for the paper as it enters under the knife 59.

N, is a reciprocating plate, the inner edge of which is adapted to press the folded wrapper against the die so as to secure the perfect adhesion of the parts of said wrapper at its edge.

P, is a trough by which the completed wrapper is led away from the machine and delivered into a convenient receptacle, as a basket, not shown.

R, is the paper, out of which the wrapper is formed.

S, is a balance wheel, or fly wheel, upon the same shaft with the roller 8; the office of the wheel S is to secure steady motion.

T, is a cam plate upon the shaft $E^2$.

1, is a shaft or spindle upon which the roll of paper is placed to be fed to the machine. The paper leads from the roll upon the shaft 1 to a roller 2 supported at the side of the trough G, thence over the roller 3 in said trough, and under a roller 4 which presses upon the paper with a yielding pressure so as to hold it in contact with the roller 3. The trough G contains liquid glue or other adhesive and the roller 3 turns in contact with the fluid adhesive in said trough, and it carries it up and applies it to the lower part of the paper R. The roller 3 is of less length than the width of the paper so that the adhesive is only applied to said paper for a part of its width, (see Fig. 7). From the rollers 3 and 4, the paper passes over a roller 5 at the outer end of the frame B, thence under a presser foot 6 supported toward the center of the frame by a cross piece 7, 7, the ends of which cross piece also act as presser feet to hold the paper flat. After passing from under the presser feet 6 and 7, 7, the paper passes into the folder H by which its edges are turned over so as nearly to meet at the center, as shown in Fig. 8. From the folder H the paper passes between rolls 8 and 9, which rolls press it together and feed it along through the machine. From the rolls 8 and 9, the paper passes into the second folder I where its edges are again turned over, as indicated in Figs. 8 and 9. From the second folder I the paper passes between the feed rolls 10 and 11 and thence over the two narrow cylinders 13 (Fig. 12) which cylinders turn in contact with a roller 12 which carries a coloring material to said cylinders so that as the paper passes over said cylinders, the color is applied to the paper, forming stripes thereon, as indicated in Fig. 10, at W, W. The cylinder 12 is supported by the lower ends of hangers $12^a$, $12^a$, at $12^b$, which hangers are secured to the frame and are provided with slots $12^d$ at their upper ends to receive the adjustable shaft of the cylinders 13. From the striper J just described, the paper passes over type upon a presser foot $14^b$ on the upper end of a reciprocating rod 14, which rod is periodically forced upward along the paper against a platen 16 and prints the label upon the paper.

$14^a$, shown most distinctly in Fig. 3, is an inking roller by which ink is applied to the type on the presser foot $14^b$.

From the printing apparatus K just described, the paper passes between dies in the cutter L by which dies the notches $R^a$ (Fig. 8) are cut in its edges. From the cutter L the paper passes through a guide V, thence between rollers 14 and 15, thence through a guide M, under the knife 59 and above the die 19, at which position a portion of the paper is severed by the knife 59 and formed by the dies just referred to, together with the reciprocating plate N, as hereinafter described.

The power is communicated to the machine through the belt $e$ rotating the pulley E and shaft $E^2$. Upon said shaft is a sprocket wheel 41 from which leads a sprocket chain 42 to sprocket wheels 43 and 44 by which the printing mechanism K and the cutting mechanism L are actuated. This is shown most distinctly in Figs. 2, 3, and 4. The turning of the sprocket wheel 43 rotates the shaft 45 and crank 46 by which the presser foot $14^b$, and the inking roller $14^a$ are actuated.

The turning of the sprocket wheel 44 rotates the rod 47 and reciprocates the cutting die 18 by means of the crank 48 and connecting rod 49. The die 18 is secured upon a cross head 51, reciprocating upon guides 50 (Fig. 4).

Upon the shaft $E^2$ is secured a disk F, from the side of which disk extends an eccentric cylindrical projection 52 having the cam groove 53 formed therein, (Figs. 15 and 19).

61, is a bell crank lever from one arm of which projects a pin into the groove 53 and to the other arm is pivoted one end of a connecting rod 62 (Figs. 19 and 20), the other end of the connecting rod 62 is pivoted to the outer end of an arm 63 secured upon a shaft 64. Upon the shaft 64 is secured a gear wheel 67 which meshes into a gear wheel 68 upon the same shaft as the roller 14. Upon the opposite end of the shaft 64 to that to which the arm 63 is secured, is a second arm bearing at its outer end the pawl 65 which engages the teeth of the wheel 67, thus as the cam plate F is rotated, it rocks the bell crank lever 61 and by means of the connecting rod 62 and arm 63, oscillates the shaft 64 and pawl 65 turning the gear wheel 67 in a step by step movement. The turning of the gear wheel 67 turns the gear wheel 68 and conveys the motion to the feeding rollers 8, 9, 10, and 11, by means of a sprocket wheel 69 on the same shaft with the gear wheel 68 and a sprocket chain 70 passing over and engaging with the teeth of sprocket wheels 71, 72, upon the same shafts as the rollers 11 and 8.

73, is an idler pulley for keeping the sprocket chain 70 taut and in proper engagement with the teeth of the sprocket wheels 69, 71, and 72.

54, (Fig. 19) is a lever arm pivoted to a stationary pivot 57 and provided with roller or contact pieces 55 and 56.

60, is a lug upon the side of the cam plate F near its periphery, adapted to strike against the roller 55 to oscillate the lever arm 54.

$60^a$, is an indentation in the plate F at its periphery into which the roller 56 passes when the lug 60 strikes against the roller 55 and oscillates the lever arm 54. After said lug has passed the roller 55, the lever arm 54 is returned to its first position by the portion of the cam plate F leading from the indentation 60ª to the periphery of said plate.

58, is a connecting rod pivoted at one end to an end of the lever arm 54 and at the other end to the knife 59, the rocking of the lever arm 54 reciprocates the knife 59 and cuts off the paper out of which the wrapper is formed.

26, (Fig. 18) is a cam groove in a face of the cam disk F.

25ª, is a rod adapted to reciprocate in stationary guides 25ᵇ, 25ᵇ.

25, is a pin extending from the rod 25ª into the cam groove 26, so that the rotation of the cam disk F shall reciprocate the rod 25ª.

21, 21, are guide lugs through apertures in which reciprocates a rod 20.

23, is a coil spring pressing at one end against the upper lug 21 and at the lower end against a collar 24 on the rod 20, and acting to hold the rod 20 with a strong, but yielding pressure, at its lower position.

19, is a convex die upon the lower end of the rod 20. 74, is the corresponding concave die fixed by wings 74ª, 74ª, upon the machine.

33, 33, (see Fig. 21) are plates having their upper edges formed to correspond with the upper surfaces of the die 74 and adapted to reciprocate vertically along the ends of, and to a position above, the upper surface of said die to overturn the ends of the blank, when held in said die, as hereinafter described and indicated in Fig. 16.

38, is a mixing tube into which gas passes from the tube 37 and is burned in the cavity 39 (Fig. 16) to keep the die 74 hot.

T, (Figs. 15 and 17) is a cam plate on the shaft E² having a cam groove t therein.

36, is a rod forked at its upper end and straddling a shaft E². There is a pin extending from the rod 36 into the cam groove t. The lower end of the rod 36 is pivoted to a lever arm 35 which engages the mixing tube 38 to reciprocate said tube, thus reciprocating the plates 33, 33, attached to the upper end thereof, (Fig. 16) to fold the ends of the blank in the dies.

30, is a pusher rod adapted to reciprocate horizontally in guides in the standards C, D.

27, is a rod pivoted at its lower end to the pusher rod 30 and at its upper end at 28 (Fig. 15) to a stationary support.

29, is a spring adapted to retract the rod 27 and consequently the pusher rod 30.

31, is a cam upon the shaft E² by which cam the rod 27 is pressed forward carrying with it the pusher rod 30 and forcing the blank out of the die 74 from which it falls into the trough P and is carried to a convenient receptacle.

The operation of the machine, as a whole, is as follows:—The paper roll is put upon the shaft or spindle 1, led over the rollers 2 and 3, under the roller 4, over the roller 5, under the presser feet 6, and 7, 7; it is then turned over so that its edges nearly meet at the top, as indicated at R¹, R¹, (Fig. 8), and passes through the folder plate H. It is then placed between the feed rollers 8 and 9 and again folded as indicated at R², R², (Fig. 8) and passes through the second folder plate I, between the rollers 10 and 11, over the striping cylinders 13, over the printing presser foot 14ᵇ, over the cutter die 18, through the guide plate V, between feed rollers 14 and 15 and into the guide plate M; the machine is then set in operation and in its action passes the paper along a sufficient distance to supply material for a single wrapper which is passed over the dies 74; the convex die 19 is then forced down against the hot die plate 74 forming the two half cylinders, indicated in Fig. 10. The paper has previously been notched, as indicated at Rª, (Fig. 8) so that a pair of opposite notches will come at the junction of these two semi-cylinders and at the edges thereof. The plates 33, 33, are now forced upward upsetting the edges of the wrapper, as indicated at Wª, Wª, (Figs. 10 and 16). The plate N is forced forward by the rising of the mixing tube 38 acting through the connecting rod 34ª and lever 34ᵇ (Fig. 18) pressing the upper edges of the wrapper which is between the dies, against the flat vertical face 19ª of the die 19, so that these edges shall be properly and firmly stuck together. The die 19 now rises and the push rod 30 is forced forward pushing the completed wrapper out of the die 74 and into the trough P.

The wrapper thus formed is adapted to inclose a number of coins of a given unit value to form a bundle of different aggregate values, which aggregate value is printed upon the outside of the wrapper by the printing apparatus K.

What I claim is:—

1. In a machine of the kind described, the combination of two co-acting dies having semi-cylindrical surfaces, means for feeding the required amount of paper through said dies in a sheet wider than said dies, means for operating said dies to form the wrapper, means for turning inward the edges of said paper protruding beyond said dies, and means for forcing the sheet of paper from the dies in the direction of the axis of said semi-cylinder.

2. In a machine of the kind described, the combination of two co-acting dies, each of said dies being formed so that its surface shall have the shape of two adjacent semi-cylinders, means for feeding the required amount of paper through said dies in a sheet wider than said dies, means for operating said dies to form the paper into two semi-cylinders, means for turning inward the edges of said paper protruding beyond the dies after said paper has been formed and is held between the dies, means for withdrawing said turning means, and means for forcing the shaped paper from the dies in the direction of the axis of said semi-cylinders.

3. In a machine of the kind described, the combination of two co-acting dies having semi-cylindrical surfaces, means for feeding the required amount of paper to said dies in a sheet wider than said dies, a plate at each end of said dies having its upper edge shaped to the same form as the surface of said dies, means for reciprocating said plates for turning inward the edges of said paper protruding beyond the dies, said plate extending below said dies, and a burner located between said plates below said dies.

4. In a machine of the kind described, the combination of two co-acting dies, each of said dies being formed so that its surfaces shall have the shape of two adjacent semi-cylinders, means for feeding the required amount of paper to said dies in a sheet wider than said dies, a plate at each end of said dies having its upper edge shaped to the same form as the surface of said dies, means for reciprocating said plates for turning inward the edges of said paper protruding beyond the dies, and means for forcing the shaped paper from the dies in the direction of the axis of the semi-cylindrical surfaces.

5. In a machine of the kind described, the combination of two co-acting dies, each of said dies being formed so that its surfaces shall have the shape of two adjacent semi-cylinders, means for feeding the required amount of paper to said dies in a sheet wider than said dies, a plate at each end of said dies having its upper edge shaped to the same form as the surface of said dies, means for reciprocating said plates for turning inward the edges of said paper protruding beyond the dies, said plates extending below said dies and a burner located between said plates below said dies.

6. In a machine of the kind described, the combination of two co-acting dies, each of said dies being formed so that its surface shall have the shape of two adjacent semi-cylinders, means for feeding the required amount of paper to said dies in a sheet wider than said dies, means for operating said dies to form said sheet in two semi-cylinders, a plate at each end of said dies having its upper edge shaped to conform to the surface of said dies, a cross-head joining in said plate below said dies, a burner carried by said cross-head, and means for reciprocating said cross-head, for the purpose described.

7. In a machine of the kind described, the combination of two co-acting dies, each of said dies being formed so that its surface shall have the shape of two adjacent semi-cylinders, means for feeding the required amount of paper to said dies in a sheet wider than said dies, means for operating said dies to form said sheet in two semi-cylinders, a plate at each end of said dies having its upper edge shaped to conform to the surface of said dies, a cross-head joining in said plate below said dies, a mixing tube opening through said cross-head and forming a guide rod therefor, means for supplying gas and air to said mixing tube, and means for reciprocating said cross-head and mixing tube to operate said plates, for the purpose described.

In testimony whereof, I sign this specification in the presence of two witnesses.

HARRY R. RADFORD.

Witnesses:
  ALICE TOWNSEND,
  ELLIOTT J. STODDARD.